United States Patent [19]

Jeppesen

[11] 4,021,115
[45] May 3, 1977

[54] REPRODUCTION CAMERA

[75] Inventor: Erling F. Jeppesen, Birkeroed, Denmark

[73] Assignee: Oce-van der Grinten N.V., Venlo, Netherlands

[22] Filed: June 17, 1975

[21] Appl. No.: 587,539

[30] Foreign Application Priority Data

June 28, 1974 Netherlands ............... 7408750

[52] U.S. Cl. .................. 355/56; 354/76; 354/198; 355/61
[51] Int. Cl.² .................. G03B 27/34; G03B 27/40
[58] Field of Search .................. 355/18, 55–63; 354/76, 198

[56] References Cited

UNITED STATES PATENTS 3,832,058  8/1974  Gusovius .................. 355/61 X

Primary Examiner—Richard A. Wintercorn
Attorney, Agent, or Firm—Albert C. Johnston

[57] ABSTRACT

Reproduction camera provided with means for displacing the lens and the original table, which include signal devices that emit electrical signals respectively representing the positions occupied by the lens and by the original table. Each signal device consists of a cam-roll type decade counting unit with drive shaft, of which each roll consists of a cam wheel with ten cams, and each cam wheel cooperates with a rotating ten-step switch with digital output.

5 Claims, 3 Drawing Figures

REPRODUCTION CAMERA

The present invention relates to a reproduction camera which for the adjustment of the reproduction factor and for focusing is provided with means for displacing the lens and the original-table relative to the image plane carrying the light-sensitive material, these means comprising two signal devices which emit electrical signals representing the positions occupied respectively by the lens and by the original-table.

Some embodiments of such apparatus are known. In one of these (see U.S. Pat. No. 3,832,058) the signal devices comprise discs which are connected with screw spindles with which the lens respectively the original-table are displaced, and which on their circumference are provided with for instance optically observable marks. During the displacement signal impulses are formed with these discs, which signal impulses are supplied to a calculating unit in which commanding signals are then generated, by means of which the reproduction factor is adjusted to the value desired and the image sharpness is controlled. A disadvantage of this embodiment is that for each reproduction the lens and original-holder must be returned to their initial position in order that the number of impulses which is representative of their position can be generated.

In other known embodiments (see Swiss Pat. No. 542,458 and British Pat. No. 902,909) the signal devices consist of potentiometers which are connected with the displacement means so that the positions of the lens and the image plane can be derived from the voltages appearing in the outputs of the potentiometers. With such apparatus it is not necessary that the lens and image plane be returned to the initial position for each reproduction; however, a big disadvantage is evident here in that the apparatus is susceptible to troubles caused by voltage fluctuations or by wear or pollution of the resistor track and/or of the slide contact of the potentiometer.

The object of the present invention is to provide a reproduction camera which does not have the above-mentioned disadvantages, and one which for that purpose is provided with simple and reliable signal devices.

This is achieved by an apparatus in which, among other features, each of the signal devices comprises a cam-roll type decade counting unit with drive shaft, each cam wheel of which drives a rotating 10-step switch which emits a digital output signal changing per step, and the drive shaft mentioned is coupled via a gear transmission to the means for displacing the lens or the original holder.

The invention and a way of practicing it are clarified by the following description and the accompanying drawings. In the drawings.

Figure 1:
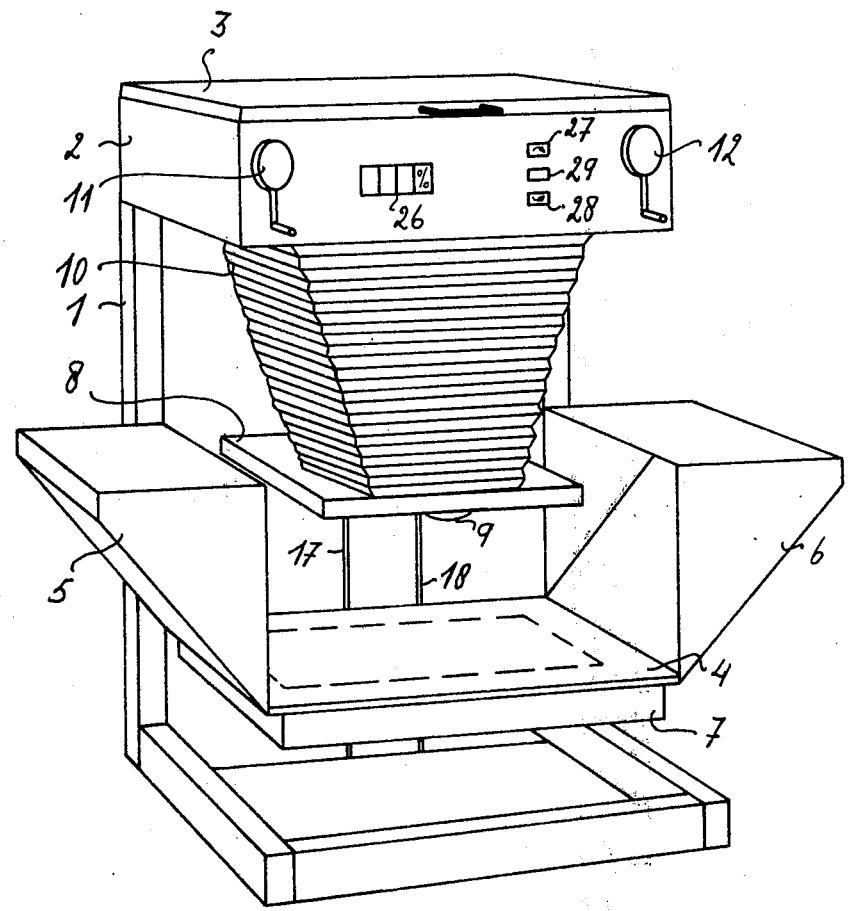
FIG. 1 is a perspective view of a camera embodying the invention.

The reproduction camera as shown in FIG. 1 comprises an upright frame 1 to which an upper body 2 is firmly fixed. Mounted in the upper body is a glass plate functioning as an image plane for receiving the light-sensitive material, which plate is covered by a hinging plate 3.

Further the camera comprises a table 4 for receiving the original to be reproduced, lamp housings 5, 6 and 7 for exposing the original, and a lens holder 8 with a lens 9 by which the image of the original can be projected onto the light-sensitive material. During the projection a bellows 10 excludes undesired light.

The upper body 2 is also provided with hand cranks 11 and 12. Crank 11 is fixed to the extremity of a shaft 13 (see FIG. 2) horizontally mounted in bearings, on which shaft a wheel 14 is installed. A tight belt 15 runs over wheel 14 and also over a wheel 16 which is fixed to a shaft 17 vertically mounted in bearings. Shaft 17 is connected with the lens holder 8 so that upon a rotation of the shaft 17 the holder 8 is displaced in vertical direction. For this purpose shaft 17 may be provided with a screw thread and the lens holder may be provided with a nut threaded on and displaced by turning of this screw thread. In order to prevent faults in the transmission, it is advisable that the wheels 14 and 16 be toothed wheels and the belt 15 be a toothed belt.

In the way described, the lens holder 8 can be moved in vertical direction by rotation of crank 11, and consequently the reproduction factor (magnification) of the camera, being defined by the distance between the glass plate and the lens, can be adjusted.

Via a similar transmission mechanism the crank 12 is coupled with a shaft 18 vertically mounted in bearings, which shaft cooperates with table 4, so that by rotation of crank 12 table 4 can be moved up and down. In this way the image which is projected on the light-sensitive material can be focused.

Figure 2:
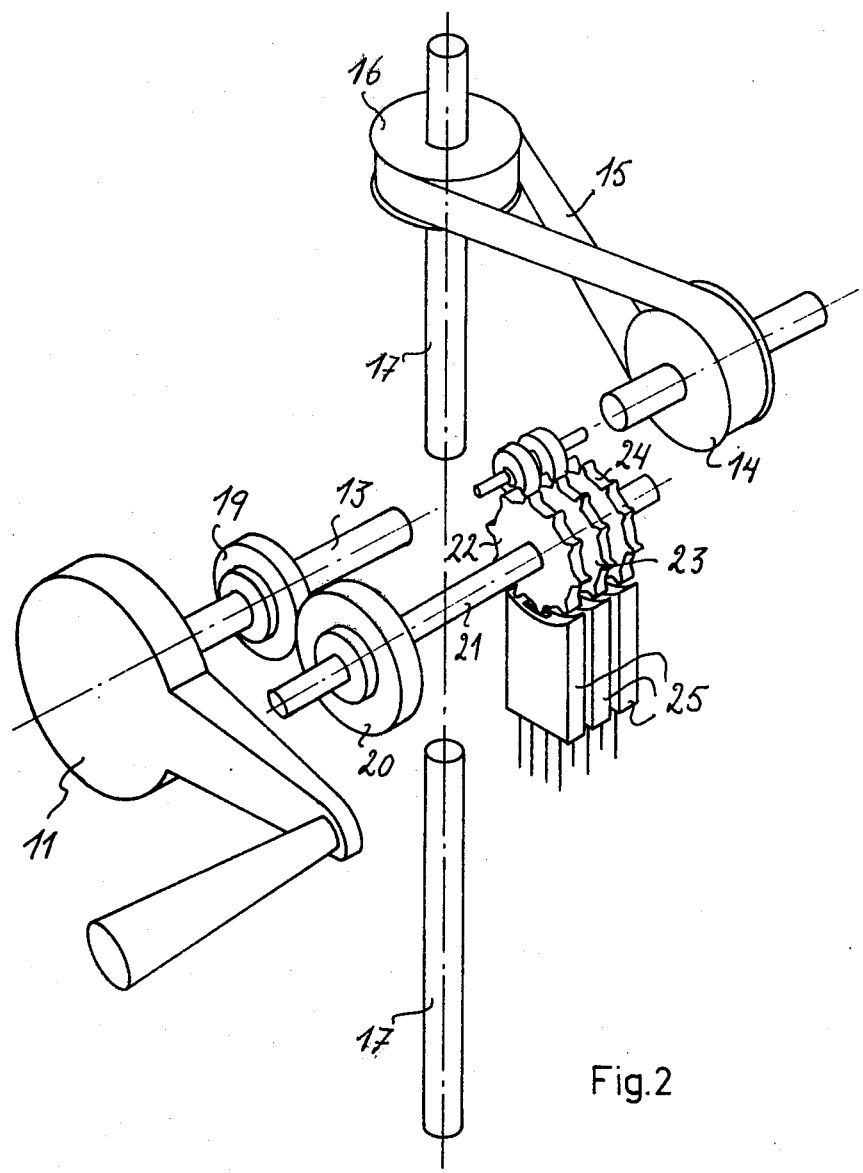
FIG. 2 is a schematic perspective view of one of the signal devices employed in this camera.

As further indicated in FIG. 2, a toothed wheel 19 is mounted on the spindle 13, which wheel cooperates with a toothed wheel 20 fixed on a shaft 21 installed horizontally in bearings. Shaft 21 is the drive shaft of a cam-roll type decade counting unit. This unit differs from the usual roll counting units only in that it is equipped with cam discs 22, 23 and 24 instead of figure rolls. Each of these cam discs is provided with 10 cams, or peripheral projections, and cooperates in a driving way with a 10-step switch 25 which is so constructed that it shows at its output a digital signal pattern which changes with each step of the switch. Switches of this kind are commercially available in many forms under the name of thumb wheel switches.

Thus it is achieved that upon rotation of crank 11 a BCD (binary coded decimal) signal appears in the outputs of the switches 25, which signal is representative of the position occupied by lens 9. By a correct selection of the transmission ratio of the toothed wheel 19 and 20, each lens displacement that has a noticeable influence on the reproduction factor will also result in modification of the BCD signal pattern. For cameras of the kind here concerned, it appears that a precision of adjustment of 1 mm is amply sufficient.

In the same way as mentioned above for crank 11 a signal device is also coupled with crank 12, which signal device continually emits a BCD signal representing the distance between table 4 and the glass plate in the upper body of the camera.

Figure 3:
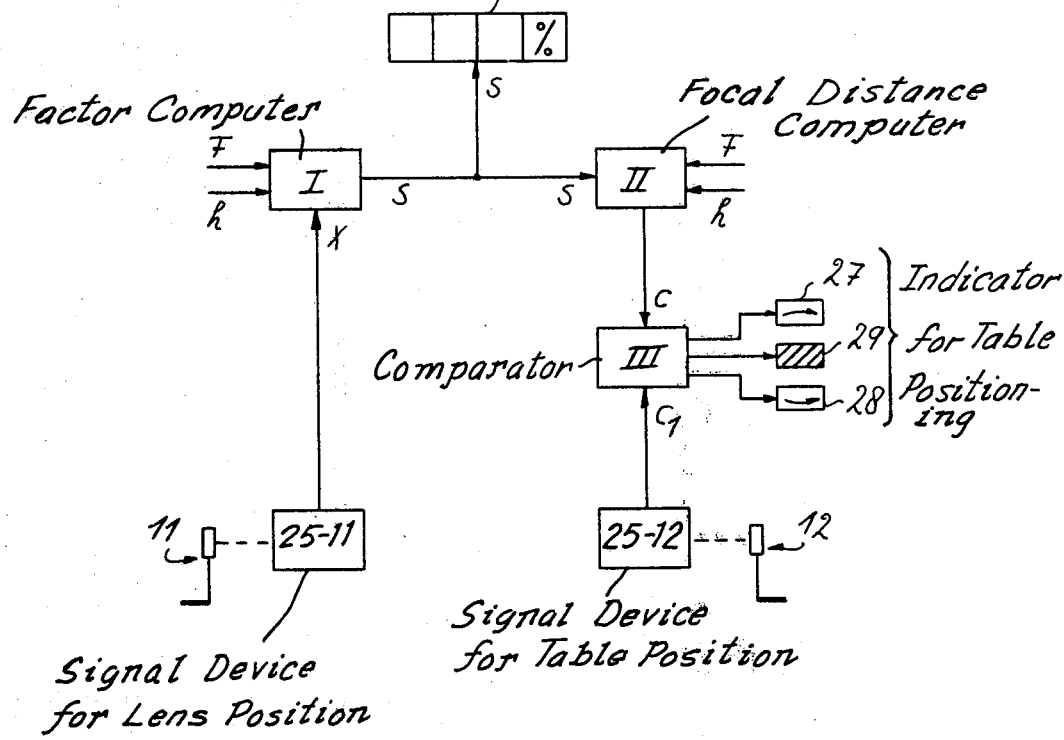
FIG. 3 schematically represents the electric circuit in which the signal devices are connected.

FIG. 3 shows schematically in block form an embodiment of an electronic circuit with the aid of which the BCD signals produced by the signal devices described above can be converted into visible signals which give indications to the operator of the apparatus for the adjustment of the camera.

The BCD signals which are obtained by the rotation of crank 11, and which represent the distance between the lens 9 and the image plane of the glass plate, hereinafter called X signals, are supplied from the signal forming device (25-11) to a calculating unit I. This calculating unit also receives signals representing the optical data of the lens employed, which in this case are signals F and $h$ representing, respectively, the focal length and the length of the objective. From the general lens formula it can be calculated that the reproduction factor of the camera (hereinafter called S) is a function which can be represented algebraically as follows:

$$S = 100/F \ (X = h/2) = 100 \ (\%)$$

The value of S according to this formula is continually calculated by the calculating unit I (for instance with a repeat frequency of 400 kHz), and an output signal which represents the reproduction factor, or magnification, for which the camera is adjusted is made visible by a display means 26, for instance by means of a kind commonly known for illuminating series of figures, which is installed in the upper body of the camera. Thus the operator of the apparatus can check continually, by rotating crank 11, the reproduction factor to which the camera has been adjusted.

From the general lens formula it is also possible to demonstrate that the distance (hereinafter called C) which is necessary between an original on table 4 and the image plane of the glass plate in order to obtain a sharp image projection is a function of the adjusted reproduction factor in relation to the optical data of the lens, and can be expressed as follows:

$$C = F \ (100/S + S/100 + 2) + h$$

The value of C is continually calculated by a calculating unit II, to which the output signal of calculating unit I is supplied as well as the signals representative of F and $h$, and this value is represented by an output of computer II which is supplied to a comparator III in the form of a BCD output signal C.

The comparator III also receives the BCD output signal from the signal device (25-12) coupled with crank 12, which signal (hereinafter called C1) represents the actual distance between the table 4 and the glass plate. In the comparator the signals C and C1 are compared with each other, and control signals are generated which are made visible to the operator of the apparatus by indicating means. For instance, in the event of inequality between the signals C and C1, a signal lamp 27 or 28 is lighted which indicates the direction in which crank 12 must be turned in order to obtain the equality desired between C and C1, and upon such equality of C and C1 being obtained an indicator lamp 29 forms for instance a colored illumination to indicate that the camera has been adjusted correctly. In this way the operator can adjust the image sharpness quickly and precisely. Of course the indicators giving the visible control signals can also be applied on the upper body of the camera, as indicated in FIG. 1.

I claim:

1. A reproduction camera including a frame having means to hold light-sensitive material in an image plane, a table for holding an original to be reproduced, a lens holder having a lens mounted therein for projecting onto said image plane a magnified image of an original exposed on said table, separate hand-operable means respectively for displacing said lens holder relative to said image plane and for displacing said table relative to said image plane, and means for indicating to a camera operator upon the setting of said lens in any selected position the relation of the actual position of said table to the position thereof required for sharply focusing said image in said image plane, said indicating means including a. first signal forming means operative according to the positions of said lens holder to form digital signal patterns X respectively corresponding to distances between said lens and said image plane,
   b. second signal forming means operative according to the positions of said table to form digital signal patterns C1 respectively corresponding to distances between said table and said image plane,
   c. first computer means responsive to the signal pattern X formed at any selected position of said lens holder, in accordance with the focal length and the length of said lens, for emitting a signal S corresponding to the image magnification at said selected position,
   d. second computer means responsive to said signal S in accordance with said focal length and said lens length for emitting a digital signal pattern C representing the distance required at said selected position between said table and said image plane for sharply focusing said image in said image plane,
   e. comparator means responsive to said signal pattern C and to the signal pattern C1 representing the actual distance between said table and said image plane for emitting control signals indicating whether said actual distance is greater or less than or equal to said required distance,
   f. and means for visibly displaying to the operator the relative table position indicated by said control signals.

2. A reproduction camera according to claim 1, said displaying means comprising lamps respectively illuminated by said control signals to indicate respectively whether said actual distance is greater or less than or equal to said required distance.

3. A reproduction camera according to claim 1, and means responsive to said signal S for visibly displaying to the operator the value of the image magnification at any position of said lens holder.

4. A reproduction camera according to claim 3, said value displaying means comprising means for illuminating figures representing said magnification.

5. A reproduction camera according to claim 1, each said signal forming means comprising a cam-roll type decade counting unit having a drive shaft, cam discs on said drive shaft, each cam discs having ten peripheral cams thereon, rotatable step switches which emit a digital signal pattern and each of which is driven stepwise by the cams of one of said cam discs so as to change the emitted signal pattern with each switch step, and transmission means for rotating said drive shaft proportionally to the displacement of said lens holder, or of said table, by one of the said hand-operable means.

* * * * *